Patented Aug. 7, 1934

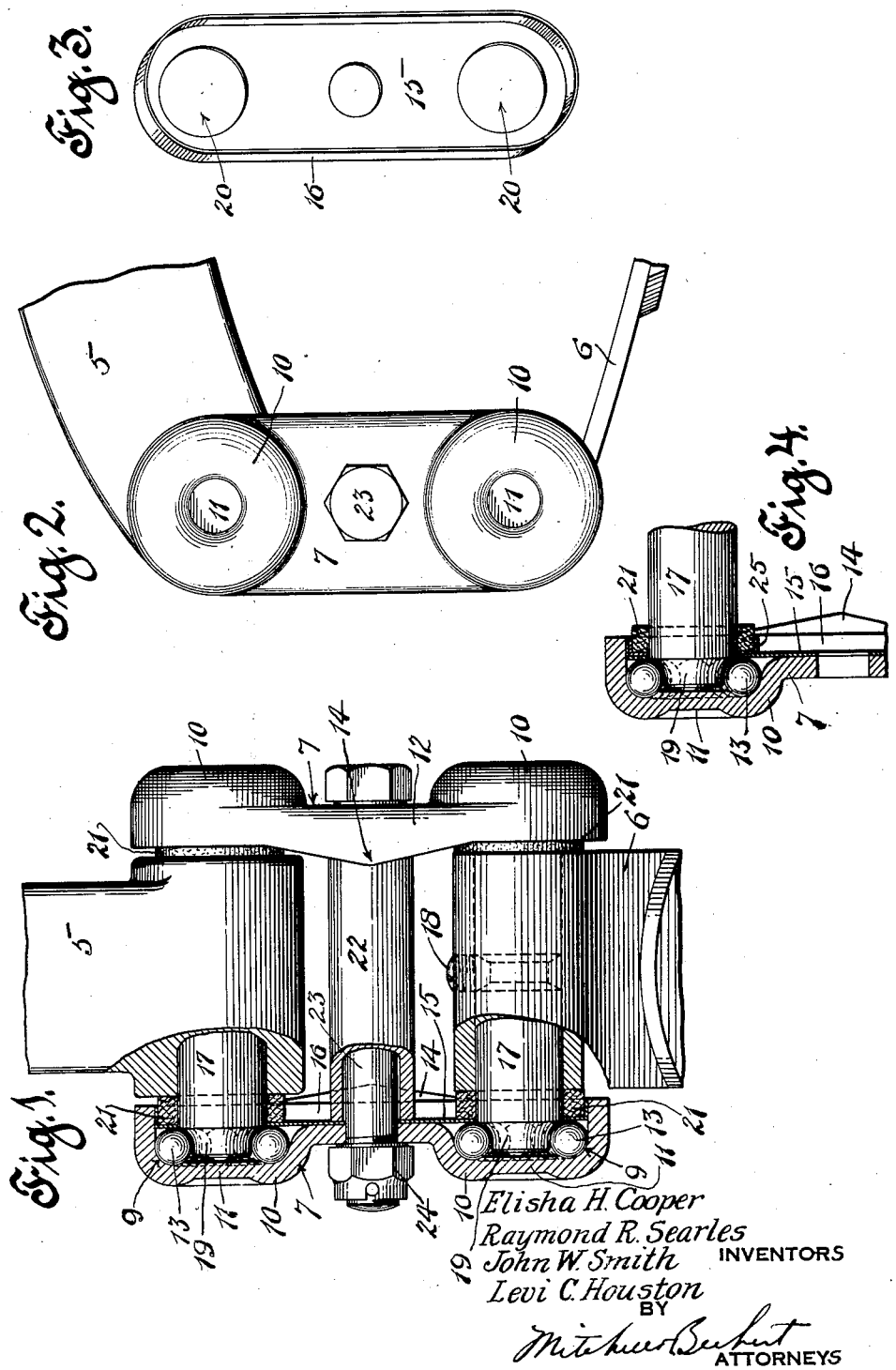

1,969,691

UNITED STATES PATENT OFFICE 1,969,691

SPRING CONNECTION

Elisha H. Cooper, Raymond R. Searles, John W. Smith, and Levi C. Houston, New Britain, Conn., assignors to The Fafnir Bearing Company, New Britain, Conn., a corporation of Connecticut Application September 11, 1930, Serial No. 481,103

2 Claims. (Cl. 267—54)

Our invention relates to a spring shackle.

It is the general object of the present invention to provide an improved form of anti-friction spring shackle which will be cheap to manufacture, simple in construction, rugged and durable in use, easy to assemble and disassemble, and not likely to get out of order.

It is the further object to provide improved details in various individual parts and in combinations all looking to simplicity, cheapness, and serviceability.

In the drawing which shows, for illustrative purposes only, preferred forms of the invention—

Fig. 1 is an end vew of a shackle and associated ends of a spring and frame, parts being shown in section to illustrate interior construction;

Fig. 2 is a view in side elevation of parts shown in Fig. 1;

Fig. 3 is an isometric view of a retainer plate;

Fig. 4 is a fragmentary view illustrating a slight modification.

In said drawing, 5 indicates a part of a frame, while 6 indicates a part of a spring to be connected to said frame by means of our improved shackle. The shackle includes links 7—7, which are duplicates of each other so that a description of one will suffice for both. Each shackle link is preferably formed of pressed metal, which may be sheet metal of the proper thickness and remain of substantially uniform thickness after being pressed into shape. Each link is preferably of substantially channel shaped form having a substantially continuous flange completely therearound. At spaced parts, preferably at the ends, each link is provided with a bearing race, which, in the form shown, is a groove 9 in the bottom of a cup 10 formed by a stamping or pressing operation. The central portion of the cup is preferably drawn up as indicated at 11 so as to provide a sufficiently deep groove so as to retain the balls against inward radial displacement. The flange portion of each link intermediate the ends is preferably extended as indicated at 12, so as to form a truss-like structure to resist bending of the link intermediate the ends thereof.

The raceways 9 for the balls 13 are preferably hardened so as to resist wear. Those parts of the flange at the sides of the link are deepened roughly from race to race as indicated at 14, to resist fracture under working strains and may even be somewhat resilient in case that be found desirable. The stamping or pressing of the link into shape tends to condense the metal at the raceways and, with proper dies, very smooth raceways may be provided. The raceways are preferably further hardened as by proper heat treatment, as will be understood. It is preferable in manufacturing on a commercial scale to harden the entire link and subsequently subject the portion of the link intermediate the raceways to heat treatment so as to toughen the same for the purpose of resisting fracture, as heretofore noted.

The anti-friction bearing members, as balls 13, may be held from escape from a detached link by means of a plate 15 which preferably completely fills the inside of the channel shaped link and which may be provided with an outwardly directed continuous flange 16 closely fitting the continuous flange of the link so as to provide a comparatively tight seal. If the raceways 9 are filled completely full of balls of the proper size, the balls in effect form arches which prevent each other from inward radial displacement, and the plate 15, coming up quite closely to the balls, prevents axial displacement. The drawing up of the central portion 11 of the cup so as to provide a relatively deep groove further acts to prevent radial displacement of the balls, and even if the grooves or races be not completely filled, such drawing up of the cup or deepening of the groove race will prevent radial displacement of the balls.

It is to be understood that normally the separate links will be loaded with balls and the plates 15 will then be pressed into place and the spaces beneath the plate loaded with grease so as to surround the balls. The link may then be handled and sold as an assembled unit.

The frame and spring carry bearing means complementary to the raceways of the links, and in the form shown we employ through pins 17—17, which may be, and preferably are, duplicates of each other. In the form shown, these pins are rigidly held in an eye of the frame and spring as by a drive fit, and in addition means such as a set screw 18 taking into a groove in the pin may be employed for additional security for either or both of said pins. The pins 17 are preferably provided with raceways 19 formed directly thereon. The balls 13 are interposed between the raceways 19 and the raceways 9 of the links. The raceways 19 may be turned, hardened, and then ground, but we prefer to rough-turn the races 19 and then before hardening finish the same by a swaging or pressing operation, which provides a cheap method of forming a relatively fine surface. The pins are thereafter hardened.

The plate 15 is provided with passages, which, as shown, constitute apertures 20—20 concentric with the raceways 9 and thus permit entry of the ends of the pins 17—17. As an additional sealing means, we employ sealing rings 21 preferably of felt, which, as illustrated, are relatively thick and are compressed between the sides of the frame and spring and the plate 15. The rings 21 preferably surround the pins 17 quite closely so that the rings 21, pins 17, and plate 15 form an effective seal for excluding dust from and retaining lubricant on the bearing members 13 and their coacting surfaces. The links are spaced apart preferably by means of a separate spacer sleeve 22 fitting between the links which may engage the plate 15, thus serving to retain the plate in place and definitely space the links apart. A suitable through-bolt 23 may extend through apertures in the links and plates 15 and be provided with a nut 24 for drawing the links up onto the spacer 22. The length of the spacer 22 is determined by the extent of preloading desired, if, in fact, preloading of the balls is effected. If the balls are to be substantially preloaded, the spacer 22 is shortened. On the other hand, if the balls are to be only slightly preloaded or not preloaded at all, the spacer 22 is made longer or spacer means added.

In that form shown in Fig. 4, instead of having the felt ring or washer 21 fit directly against the plate 15, we employ a separate sheet metal cup 25, which may fit within the flange of plate 15 as shown. The additional cup 25 serves to give added peripheral support to the felt washer 21. Such cups 25 may or may not be employed. The felt washers may be compressed between the shackle links and adjacent spring and frame parts.

It will be seen that we have provided a shackle construction of but few and simple parts. All parts are readily and cheaply manufactured and assembled and the entire assembly may be very quickly made. The parts, though simple and cheap to manufacture, are of exceedingly sturdy construction, not likely to get out of order, and will be long lived. Due to the effective seal of the bearing members, fresh lubricant will be required only at long intervals, if in fact a second lubrication is ever required during the life of the car.

While the invention has been described in considerable detail, it is to be understood that various modifications, omissions, and additions, may be made within the scope of the invention as defined in the appended claims.

We claim:

1. As an article of manufacture, a shackle link comprising a substantially channel-shaped member having raceways at spaced apart portions thereof, anti-friction bearing members on said raceways, and an outwardly flanged plate fitting within said channel-shaped link and extending over the raceways thereon in position to engage said anti-friction bearing members to prevent axial displacement thereof, said plate having passages therein adjacent each of said raceways.

2. As an article of manufacture, a shackle link comprising a channel shaped member having a continuous flange extending completely therearound, raceway cups formed directly in the metal of said link at spaced apart points, said link being hardened at the zones of the raceways and being of toughened metal at the zone intermediate said raceways, a peripherally flanged plate fitting in said channel portion of said link, the flange of said plate being in close fitting engagement with the continuous flange of said link, anti-friction bearing members on the raceways of said link and being held against axial displacement by said plate.

ELISHA H. COOPER.
RAYMOND R. SEARLES.
JOHN W. SMITH.
L. C. HOUSTON.